United States Patent [19]

Shyu

[11] Patent Number: 4,924,036

[45] Date of Patent: May 8, 1990

[54] MULTI-PURPOSE APPARATUS FOR DISTRIBUTING WIRES

[76] Inventor: June Y. Shyu, 4F, No. 8, Alley 14, Lane 121 Gen Hua St., Taipei, Taiwan

[21] Appl. No.: 321,121

[22] Filed: Mar. 9, 1989

[51] Int. Cl.$^5$ ............................................. H02G 3/04
[52] U.S. Cl. ...................................... 174/97; 52/287; 174/70 C; 439/209
[58] Field of Search ................ 174/48, 49, 68.3, 70 C, 174/72 C, 95, 97, 101; 361/428; 439/207, 208, 209, 210, 211, 214, 215, 216; 52/287, 288

[56] References Cited

U.S. PATENT DOCUMENTS

| | | | |
|---|---|---|---|
| 1,250,594 | 12/1917 | Knapp | 52/287 |
| 3,821,688 | 6/1974 | Larsile | 174/97 X |
| 4,622,791 | 11/1986 | Cook et al. | 52/287 X |
| 4,720,768 | 1/1988 | Schindele | 361/428 X |

FOREIGN PATENT DOCUMENTS

| | | | |
|---|---|---|---|
| 25369 | 8/1972 | Australia | 174/101 |
| 1248127 | 8/1967 | Fed. Rep. of Germany | 174/68.3 |
| 2588425 | 4/1987 | France | 52/287 |
| 609943 | 10/1960 | Italy | 174/97 |
| 409340 | 10/1966 | Switzerland | 52/287 |
| 435396 | 10/1967 | Switzerland | 174/68.3 |
| 1059855 | 2/1967 | United Kingdom | 174/97 |

*Primary Examiner*—Laramie E. Askin
*Attorney, Agent, or Firm*—Browdy and Neimark

[57] ABSTRACT

The multi-purpose apparatus for distributing wires mainly comprises a strip member having at one lateral wall a longituidnal opening with flanges respectively formed on opposite edges thereof, and a plurality of single units each having along its length a pair of longitudinal grooves respectively being located at opposite edges of the unit and corresponding to the longitudinal flanges of the strip member such that each single unit can be detachably secured to the strip member by forcing the flanges thereof into the corresponding grooves thereof. Those single units include decorative plate assemblies, electrical socket assemblies, switch assemblies and other terminals such as telephone wire junction box, antenna socket, speaker wire socket, and signal wire socket. The strip member further is provided along its upper and lower edges with a pair of wire receiving chambers in which power wires and ground wires including signal wires are respectively received. In this way, the potential risk of short circuit due to unexpected contact of broken power wires and broken ground wires, and of noise disturbance to signal wires, would be minimized. Moreover, the strip member is so designed that adjacent strip members either aligned or angularly intersecting each other, can be connected together by means of specially designed joints. By doing so, both the length of and the intersecting angle between the strip members become adjustable, thus facilitating the installation of the members to the lower edge of an indoor wall.

1 Claim, 4 Drawing Sheets 4,924,036

MULTI-PURPOSE APPARATUS FOR DISTRIBUTING WIRES

BACKGROUND OF THE INVENTION

The present invention relates to a multi-purpose apparatus for distributing wires and more particularly to one which comprises a strip member having separate chambers for respectively receiving power wires and ground wires (including signal wires), and a plurality of single units (including decorative plate assemblies, electrical socket assemblies, switch assemblies and other desired terminals) to be detachably secured to said strip member so as to provide more flexible functions and to maintain the room appearance.

For safety purposes, indoor wires usually are distributed along and received in tubular hollow members which normally are embedded in the wall for the purpose of maintaining the room appearance. The electrical wires received in said tubular hollow members are distributed therealong to connect with associated switches, electrical sockets and other desired terminals. That is to say, if further alteration to the existing wire distibution is desired, it is almost impossible to effect it without destroying the original distribution layout since all of the existing switches and electrical sockets are fixed at predetermined locations to terminals in order to supply electrical power thereto. Under such circumstances, after said switches, electrical sockets and other desired terminals were fixed to predetermined locations which are defined by the finalized wire distribution, they could not be flexibly removed from one location to another. In view of such a restriction, some problems are caused, especially when people intend to decorate the room and/or to relocate the original room layout. Furthermore, since conventional apparatus for distributing wires usually contains both the power wires and the ground wires in the same space, the potential risk of short circuit due to the unexpected contact of broken power wires and broken ground wires could not be effectively minimized. It is, therefore, the object of the present inrention to obviate and mitigate the aforesaid drawbacks.

SUMMARY OF THE INVENTION

It is an object of the present invention to provide a multi-purpose apparatus for distributing wires to which electrical sockets, switches and other desired terminals could be detachably secured, thereby significantly eliminating the problems existing in the wire distribution field.

It is another object of the present invention to provide a multi-purpose apparatus for distributing wires which possesses separate chambers to respectively receive power wires and ground wires so as to effectively minimize the possibility of short circuits due to the unexpected contact of broken power wires and broken ground wires.

It is still another object of the present invention to provide a multi-purpose apparatus for distributing wires which is easy to be installed to the lower edge of the wall and is able to maintain the room appearance.

BRIEF DESCRIPTION OF THE DRAWINGS

The invention itself as well as other features and advantages thereof will be best understood by reference to the detailed description in conjunction with the accompanying drawings, wherein.

DETAILED DESCRIPTION OF THE PREFERRED EMBODIMENT

Figure 1:
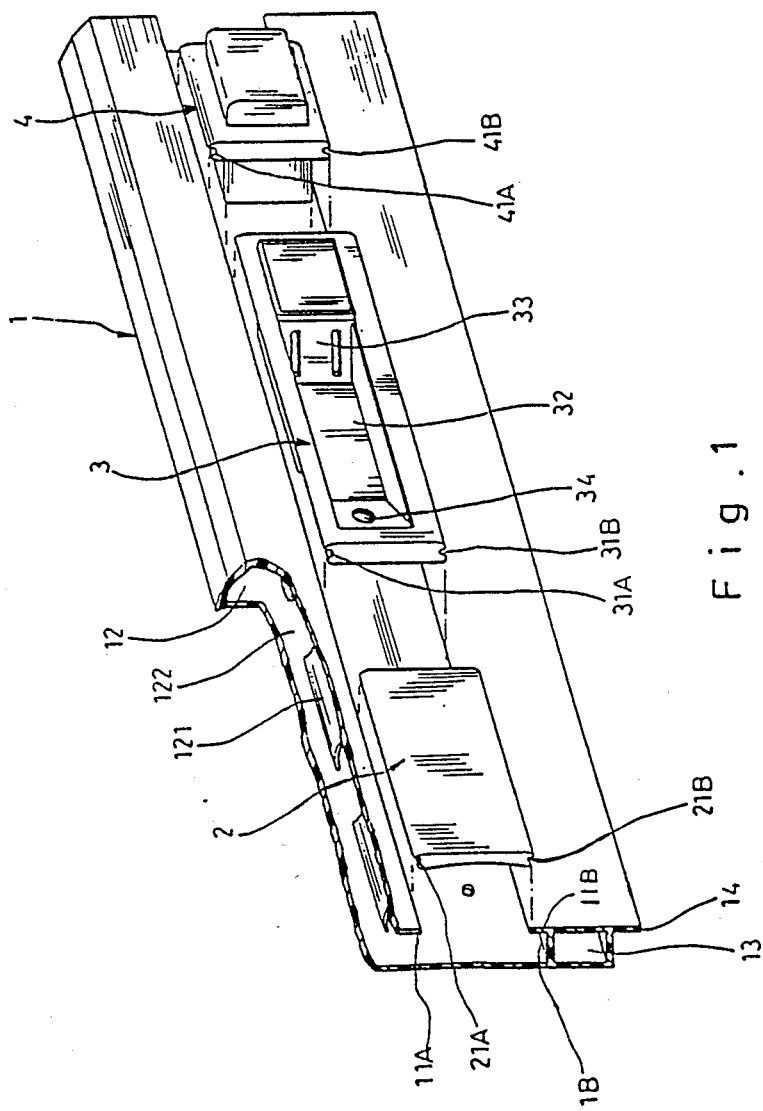
FIG. 1 is a partially cut-away view of a preferred embodiment of the present invention.
Figure 2:
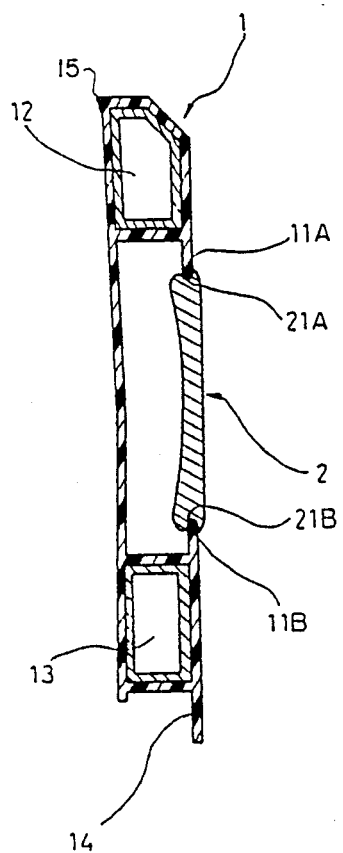
FIG. 2 is a cross-sectional view illustrating the combination of a single unit with a strip member in accordance with the present invention.

Referring to FIGS. 1 and 2, a preferred embodiment of the present multi-purpose apparatus mainly comprises a strip member (1) as the main body. One lateral wall of said strip member (1) is formed along its length with a longitudinal opening with flanges (11A) and (11B) respectively formed on opposite longitudinal edges thereof. A pair of wire reeiving chambers (12) longitudinal edges of said strip member (1). The interior of the chamber (12) is provided along its length with of the chamber (12) is provided along its length with a plurality of upwardly curved partitions (121) each being spaced from its adjacent partition by a wire distribution opening (122). The chamber (12) further is provided at one end with a vertical pattern portion (123) (see FIG. 3A) and at the other end with a horizontal pattern portion (124) (see FIG. 3B). The chamber (13) has an identical structure with that of the chamber (12) and thus the description will not be repeated herein. The strip member (1) further has at its bottom edge a spacer plate (14). There are a number of single units including decorative plate assemblies (2), electrical socket assemblies (3), switch assemblies (4) and other desired terminals such as telephone wire junction box, antenna socket, speaker wire socket, etc. to be detachably secured to the strip member (1). For clarity purpose, said decorative plate assembly (2) is taken as an illustrative example to show how to detachably secure it to the strip member (1) as follows. The decorative plate assembly (2) is furnished at its opposite edges with a pair of longitudinal grooves (21A) and (21B) respectively corresponding to the flanges (11A) and (11B) of the strip member (1) such that said decorative plate assembly (2) can be detachably secured to said strip member (1) by respectively forcing said flanges (11A) and (11B) into said grooves (21A) and (21B). Similarly, the electrical socket assembly (3) has at its opposite edges a pair of longitudinal grooves (31A) and (31B) respectively corresponding to the flanges (11A) and (11B) of said strip member (1); and the switch assembly (4) also has at its opposite edges a pair of longitudinal grooves (41A) and (41B) respectively corresponding to the flanges (11A) and (11B) of the strip member (1). The electrical socket assembly (3) further possesses a customarily known socket (33) and a hole (34) into which a screwdriver can be inserted in order to remove the socket assembly (3) from the strip member (1), if desired. In this embodiment, the chamber (12) serves for receive power wires therein while the chamber (13) serves to receive ground wires and/or signal wires therein. Please note that the electrical wires respectively received in chambers (12) and (13) are connected to associated electrical socket assemblies (3), switch assemblies (4) and other desired terminals to supply electrical power thereto. The spacer plate (14) is used to prevent any moisture coming from the floor from entering into the strip member (1), and to effect the mismatch between the rough floor surface and the smooth lower edge of the strip member (1) as said strip member (1) is installed to the lower edge of the wall. A backward bent member (15) of flexible material is integrally formed with the upper edge of the strip member (1). In use, said member (15) can closely contact the wall to which the strip member (1) is installed so as to prevent dirt from falling downward behind said strip member (1).

Figure 3A:
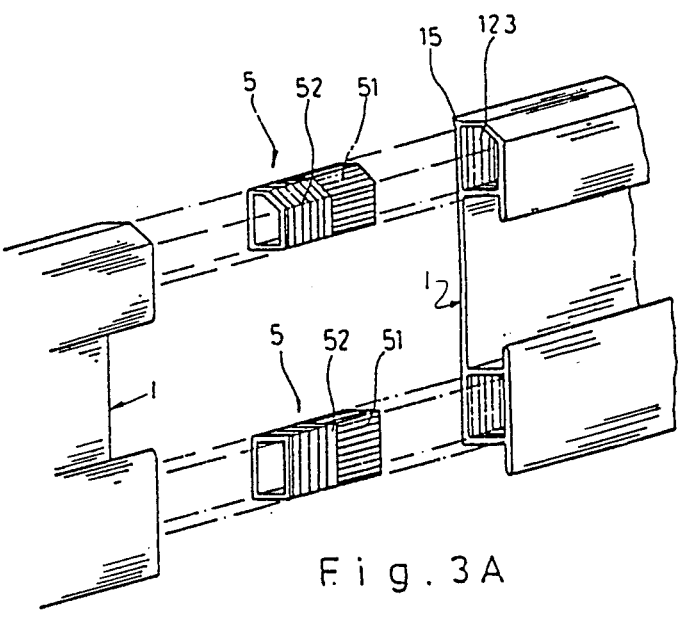
FIG. 3A is a schematic view showing how to connect two aligned strip members with a joint in accordance with the present invention.
Figure 3B:
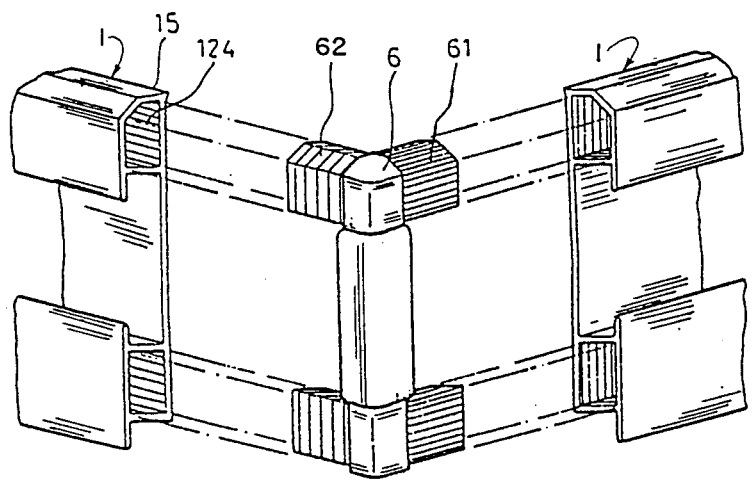
FIG. 3B is another schematic view showing how to connect two angularly intersected strip members with a L-shaped joint in accordance with the present invention.
Figure 4:
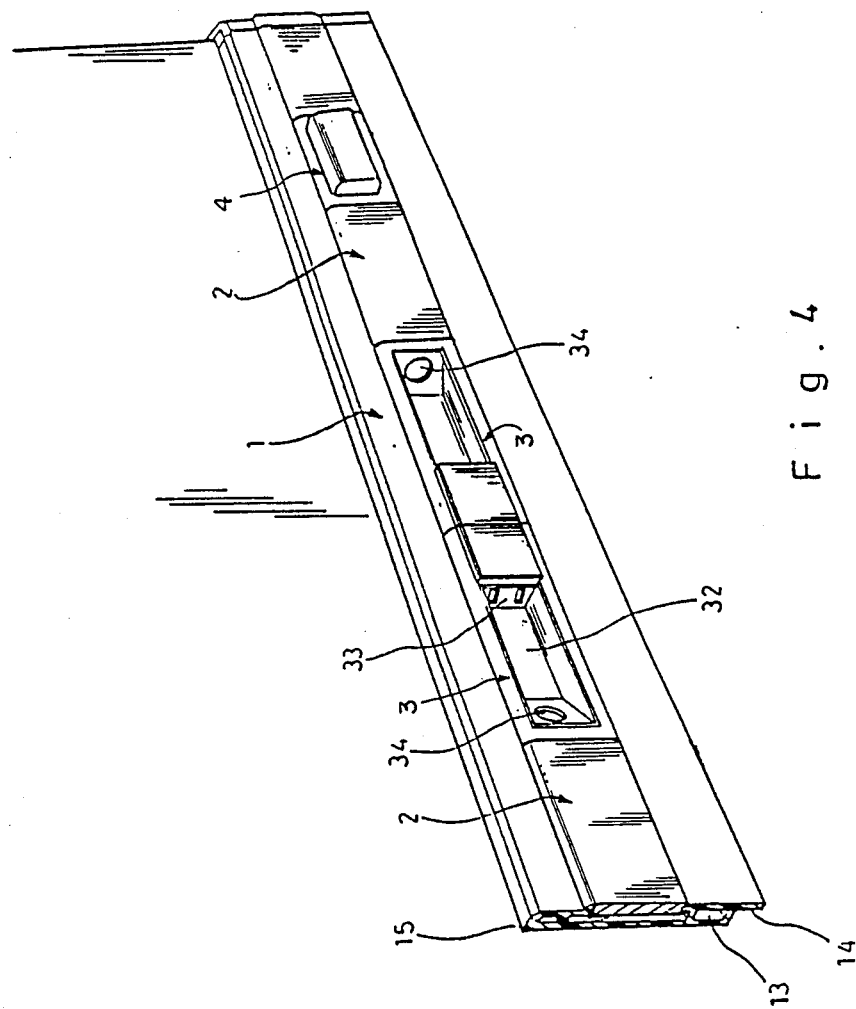
FIG. 4 is a perspective view showing a preferred embodiment of the present invention.

Referring to FIGS. 3A and 3B, two adjacent strip members (1), either aligned or angularly intersecting each other, could be connected together by means of specially designed joints (as will be described below). As shown in FIG. 3A, a joint (5) of a first type consists of a horizontal pattern portion (51) and a vertical pattern portion (52). In assembly, said horizontal pattern portion (51) is first forced into the corresponding vertical pattern portion (123) of the chamber of one of the two adjacent strip members (1) and then the vertical pattern portion (52) is inserted into the corresponding horizontal pattern portion (124) of the chamber of the other strip member (1) so as to achieve a reliable connection. In this way, the length of the strip member (1) in accordance with the present invention can be flexibly extended without any adverse restriction. As shown in FIG. 3B, an L-shaped joint (6) consists of a horizontal pattern arm (61) and a vertical pattern arm (62) formed by following similar procedures to those described above; said L-shaped joint (6) can connect two angularly intersected strip members (1). Of course, the intersection angle formed between the two arms of the L-shaped joint (6) is determined in accordance with the corner curve of the wall to which the strip is to be installed; thereby the captioned strip member (1) would fully meet the design requirements.

In view of the above, the major advantages achieved by the present invention could be summarized as follows:

1. Since single units (such as switch assemblies, electrical socket assemblies, etc) are detachably secured to the strip member, each single unit, as desired, can be removed from one location to another without any difficulty.

2. The present invention would maintain the room appearance since all the wires are properly received in the well decorated strip member.

3. Since the switch assemblies, electrical socket assemblies and other desired terminals are detachably secured to the strip member rather than securely fixed thereto, the flexibility of room layout arrangement is considerably increased.

4. Since the present invention is installed to the lower edge of the wall, the switch assemblies can thus be actuated by a user's foot. This allows the user to turn on/turn off the switch even when he holds articles with both of his hands.

5. Since the power wire and ground wire (including signal wire) are separately received in spaced chambers, the potential risk of short circuit due to the unexpected contact of broken power wires and broken ground wires, and of noise disturbance to signal wires, are effectively minimized.

6. Two adjacent strip members, either aligned or angularly intersecting each other, can be easily connected together by means of specially designed joints so as to facilitate the installation of said strip members to the wall.

7. Since the combination of the single unit and the strip member is achieved by engaging a flange with its corresponding groove, the present invention is easy to assemble and/or disassemble.

While the present invention has been described with reference to an illustrative embodiment, this description is not intended to be construed in a limiting sense. It is, therefore, contemplated that the appended claim will cover any modifications or embodiments as fall within the true scope of the present invention.

I claim:

1. A Multi-purpose apparatus for distributing wires comprising:

a strip member having an upper flange and a lower flange, said strip member being formed at its upper and lower edges with chambers, for receiving wires, each chamber having in its interior a plurality of upwardly bent partitions each being spaced from its adjacent partition by a wire distribution opening, each chamber being formed at one end with a horizontal pattern portion and at the other end with a vertical pattern portion, a backward bent member of flexible material being disposed at the uppermost edge of said strip member; a plurality of single units including decorative plate assemblies, electrical socket assemblies, switch assemblies and other desired terminals, each single unit having an upper groove and a lower groove respectively corresponding to said upper flange and lower flange of said strip member such that said single unit is able to be detachably secured to said strip member by respectively forcing said upper and lower flanges into said upper and lower grooves, wires received in said chambers of said strip member and being connected to associated single units to supply electrical power thereto; a joint consisting of a horizontal pattern portion and a vertical pattern portion which respectively correspond to said vertical pattern portion and said horizontal pattern portion of each of said chambers of said strip members in order to connect two aligned strip members; and an L-shaped joint consisting of a horizontal pattern arm and a vertical pattern arm which respectively correspond to said vertical pattern portion and said horizontal pattern portion of each of said chambers of said strip member in order to connect two angularly intersecting strip members.

* * * * *